United States Patent [19]
Klingler

[11] 3,932,028
[45] Jan. 13, 1976

[54] MIRROR AND GUIDE DEVICE FOR A TRACTOR

[76] Inventor: Jerome J. Klingler, P.O. Box 442, New Ulm, Minn. 56073

[22] Filed: July 22, 1974

[21] Appl. No.: 490,905

[52] U.S. Cl.............. 350/307; 33/264; 248/475 R; 350/277
[51] Int. Cl.².......................................... G02B 5/08
[58] Field of Search....... 33/264; 248/466, 475–487; 350/58–60, 277, 302, 307

[56] References Cited
UNITED STATES PATENTS

| | | | |
|---|---|---|---|
| 1,373,852 | 4/1921 | Allen | 33/264 X |
| 1,576,793 | 3/1926 | Sadler | 350/307 |
| 2,198,864 | 4/1940 | Degrelle | 33/264 UX |
| 2,538,112 | 1/1951 | Maier | 33/264 |
| 2,573,443 | 10/1951 | Holland | 248/480 |
| 2,636,418 | 4/1953 | Leonard | 248/478 |
| 2,649,839 | 8/1953 | Condon | 350/58 UX |
| 2,750,840 | 6/1956 | Sklarek | 248/481 |
| 2,758,508 | 8/1956 | Petri et al. | 350/289 UX |
| 3,241,253 | 3/1966 | McKee | 350/307 X |

FOREIGN PATENTS OR APPLICATIONS

| | | | |
|---|---|---|---|
| 794,962 | 5/1958 | United Kingdom | 350/307 |

*Primary Examiner*—Alfred E. Smith
*Assistant Examiner*—F. L. Evans
*Attorney, Agent, or Firm*—Williamson, Bains & Moore

[57] ABSTRACT

A mirror and guide attachment device for a tractor having a trailing cultivator implement towed thereby, includes a mirror assembly mounted on the tractor adjacent and rearwardly of one of the front wheels of the tractor. The mirror assembly is positioned in angulated relation with respect to the ground surface to permit the tractor operator to observe certain rolling shields and cultivator tools on the trailing cultivator implement during the cultivating operation. An elongate guide element is connected with a mounting bracket of the mirror assembly and serves to facilitate guiding of the tractor and trailing cultivator implement during the cultivating operation.

4 Claims, 6 Drawing Figures

MIRROR AND GUIDE DEVICE FOR A TRACTOR

SUMMARY OF THE INVENTION

This invention relates to a mirror and guide attachment device for a tractor having a trailing cultivator implement towed thereby.

When row crops are cultivated with a cultivator implement towed by a tractor, the tractor operator is required to constantly turn rearwardly during the cultivating operation to determine if the cultivating shovels and shields are properly disposed with respect to the row crops being cultivated. On hillsides, the tractor tends to drift slightly in a lateral direction which sometimes results in the row crops being covered with the soil. Therefore, unless the cultivator tools are properly aligned with respect to the crop rows, not only will certain crop rows be covered with soil during the cultivating operation, but in some instances, the cultivating shovels will be spaced too far from the rows to effectively remove the weeds. It is also tiring for the tractor operator to constantly turn rearwardly from his normally forward facing position in order to view the cultivator tools during the cultivating operation.

It is therefore a general object of this invention to provide a mirror device which may be readily attached to a tractor having a cultivating implement connected thereto, to permit the tractor operator to readily and easily observe the row crops being cultivated while the operator faces in a generally forward direction. It is also an object of this invention to provide the mirror device with a guide assembly which permits the operator to accurately guide the tractor in a forward direction.

These and other objects and advantages of this invention will more fully appear from the following description made in connection with the accompanying drawings wherein like reference characters refer to the same or similar parts throughout the several views.

FIGURES OF THE DRAWINGS

DESCRIPTION OF THE PREFERRED EMBODIMENTS OF THE INVENTION

Figure 1:
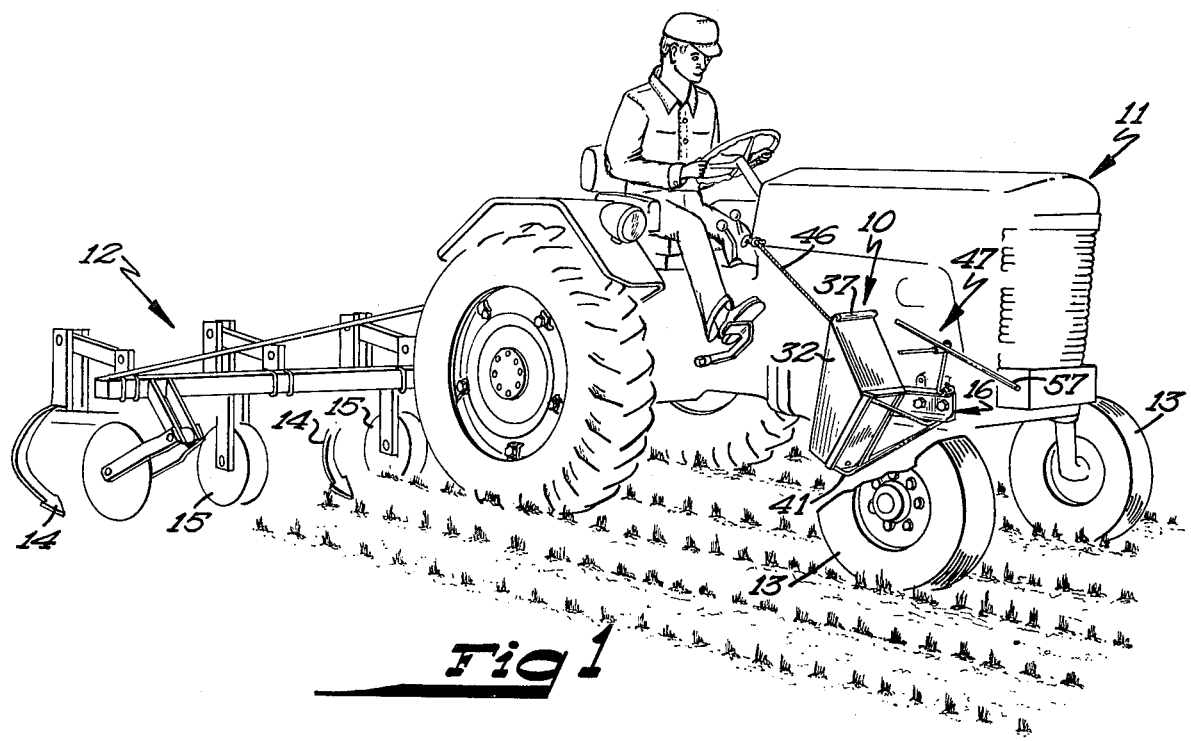
FIG. 1 is a perspective view of a tractor having a trailing cultivating implement attached thereto and also having the novel mirror and guide device mounted thereon.

Referring now to the drawings and more specifically to FIG. 1, it will be seen that one embodiment of the novel mirror and guide device, designated generally by the reference numeral 10, is shown mounted in cooperative relation on a conventional tractor 11 to which is connected a trailing cultivator implement 12. The tractor 11 is provided with ground engaging wheels including a pair of front wheels 13. The cultivator implement 12 is of conventional construction and includes a frame including a tool bar which has a plurality of cultivator shovels 14 and rolling shields 15 secured thereto. The cultivator shovels 14 are adapted to cultivate the soil between the rows of a conventional row crop such as beans, corn or the like, while the rolling shields 15 are arranged in pairs and the shields of each pair are disposed on opposite sides of a crop row to prevent the crop row from being covered during the cultivating operation.

The mirror and guide device 10 includes means for mounting the device on the tractor 11 and this means includes an elongate substantially straight channel bracket 16 including a web 17 having flanges 18 secured thereto and projecting therefrom. The web of the channel bracket 16 is provided with openings therein for accommodating bolt assemblies 19 to rigidly but detachably mount the channel bracket on the body of the tractor.

The channel bracket 16 provides a mounting for a mirror assembly 20 which is comprised of a generally rectangular frame 21, including elongate straight side frame elements 22 rigidly secured to transverse frame elements 23. It will be noted that these frame elements are of angle construction.

Figure 4:
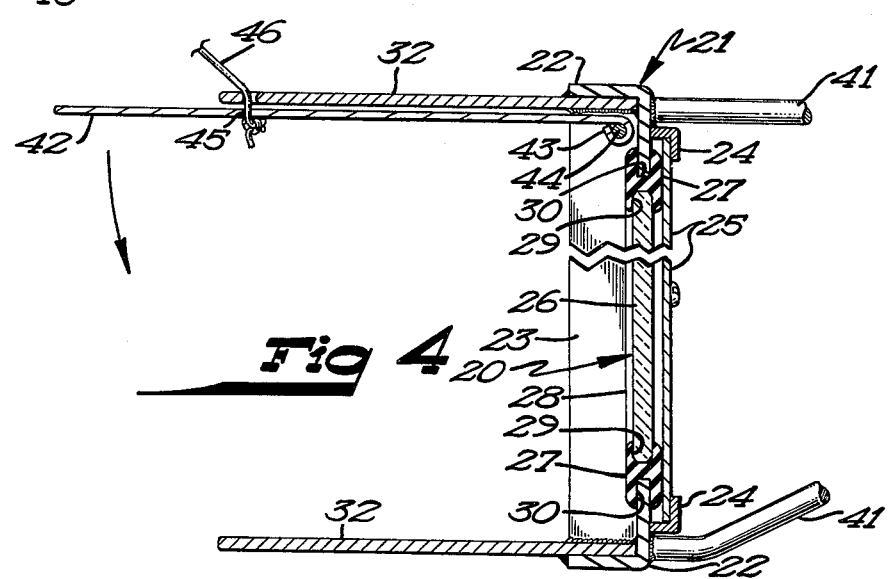
FIG. 4 is a cross-sectional view taken approximately along lines 4—4 of FIG. 3 and looking in the direction of the arrows.
Figure 5:
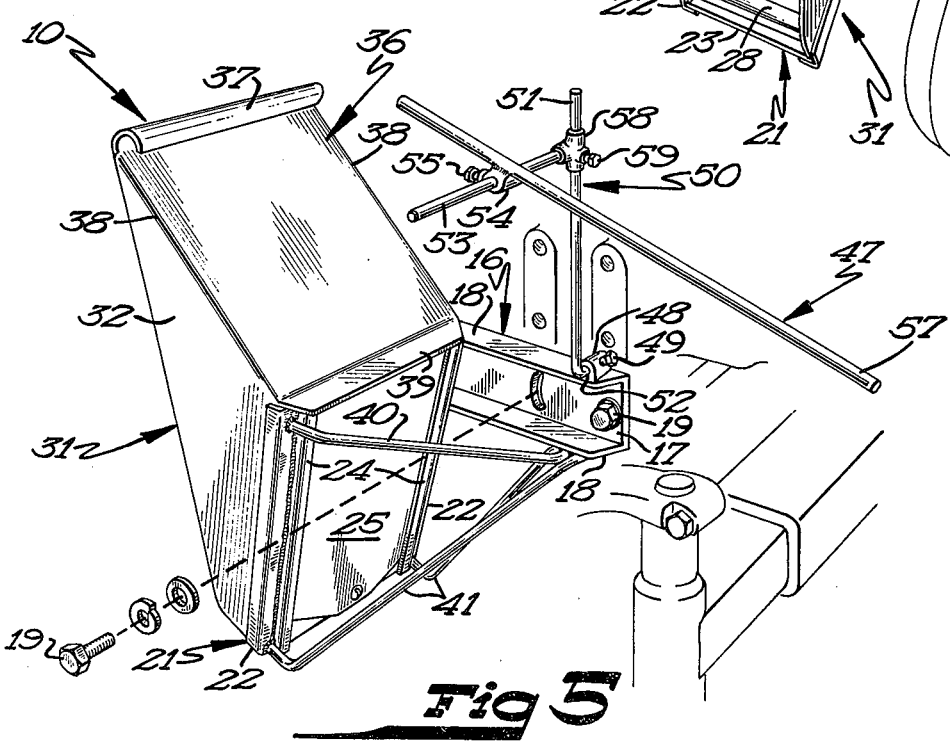
FIG. 5 is a rear perspective view of the mirror and guide device.

Referring now to FIGS. 4 and 5, it will be seen that a pair of elongate substantially straight angle brackets 24 are each rigidly secured to the front surface of one of the side frame elements 22 and project forwardly therefrom. In this respect, one flange of each angle bracket 24 is spaced forwardly from the associated side frame elements 22. A substantially flat, generally rectangular shaped rear plate 25 is disposed between the angle brackets 24 and the frame elements of the rectangular frame 21, the rear plate being rigidly secured to the angle brackets 24.

A generally rectangular shaped flat mirror 26 is mounted on the rectangular frame 21 by a pair of vertical dampening elements 27 and a pair of transverse dampening elements 28. These dampening elements are formed of a yieldable resilient material preferably rubber and each has an elongate inner slot 29 therein and an elongate outer slot 30 therein. It will be seen that the inner slot 29 of each dampening elements receives a marginal portion of the mirror therein while the outer slot of each dampening element receives a flange of an adjacent frame element thereon.

The mirror assembly also includes a shield structure 31 which is comprised of a pair of substantially identical triangular side shield plates 32, each including an upper angular edge, 33, a lower angular edge 34 and a vertical edge 35. The shield structure is also comprised of a top shield plate 36 which is of generally rectangular configuration, as best seen in FIG. 5, and which has a curled or rolled upper edge 37. The side edges 38 of the top plate are rigidly secured to the upper angular edges 33 of the side shield plates 32 and the rear edge portion 39 is rigidly secured to the uppermost transverse frame element 23 and projects forwardly therefrom. It will also be noted that the lower angular edges 34 of the side shield plates are rigidly secured to the side frame elements 22 of the rectangular frame 21. The shield structure 31 not only protects the mirror from flying objects such as stones or the like, but the shield structure also serves to minimize glare with respect to the reflective surface of the mirror. In this respect, the inner surfaces of the top and side plates of the shield structure may be painted with a flat or non-reflective material to further minimize glare.

Figure 2:
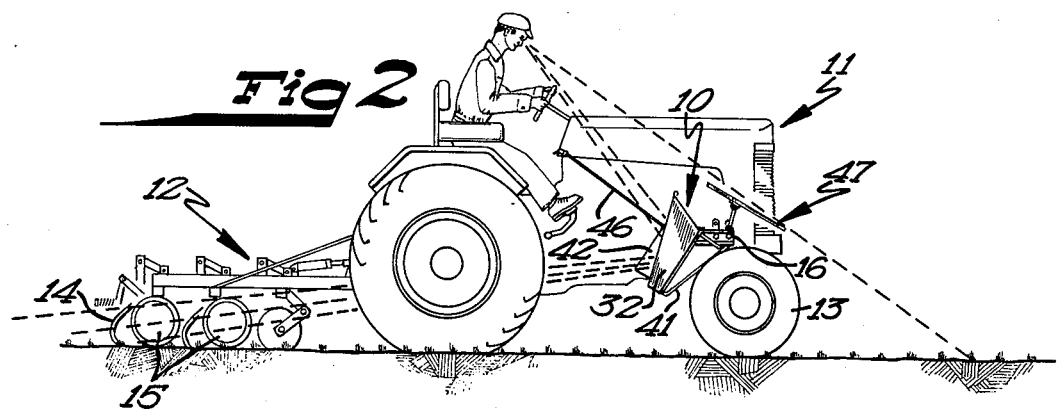
FIG. 2 is a side elevational view of the tractor and trailing implement and illustrating by dotted line configuration, the line of vision of the operator and the reflected image of the mirror during the cultivating operation.
Figure 3:
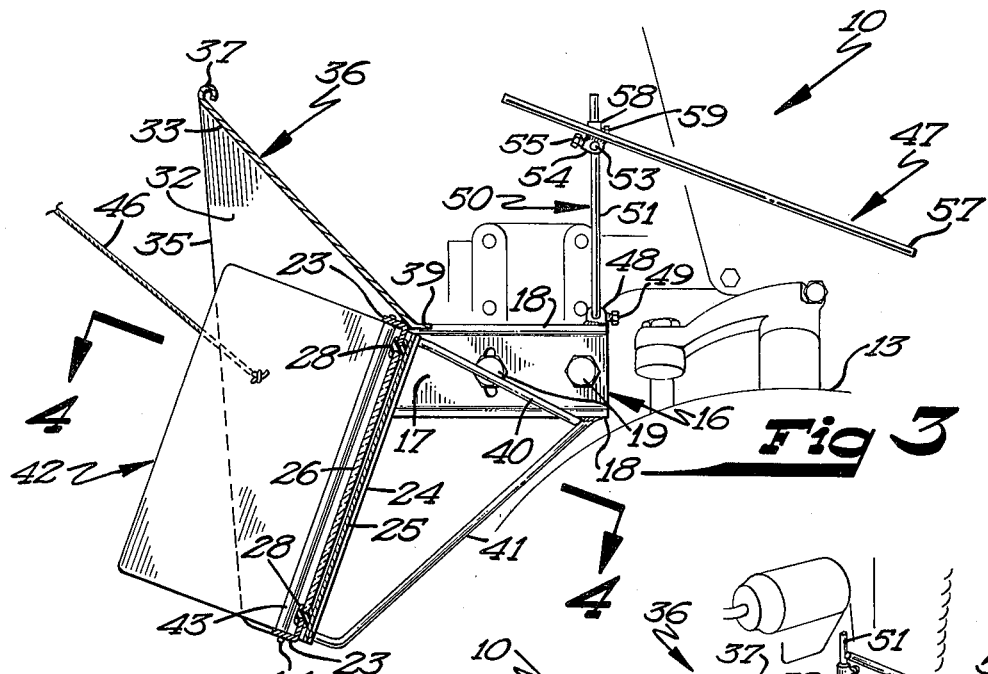
FIG. 3 is a vertical cross-sectional view through the mirror and guide device illustrating details of construction thereof.
Figure 6:
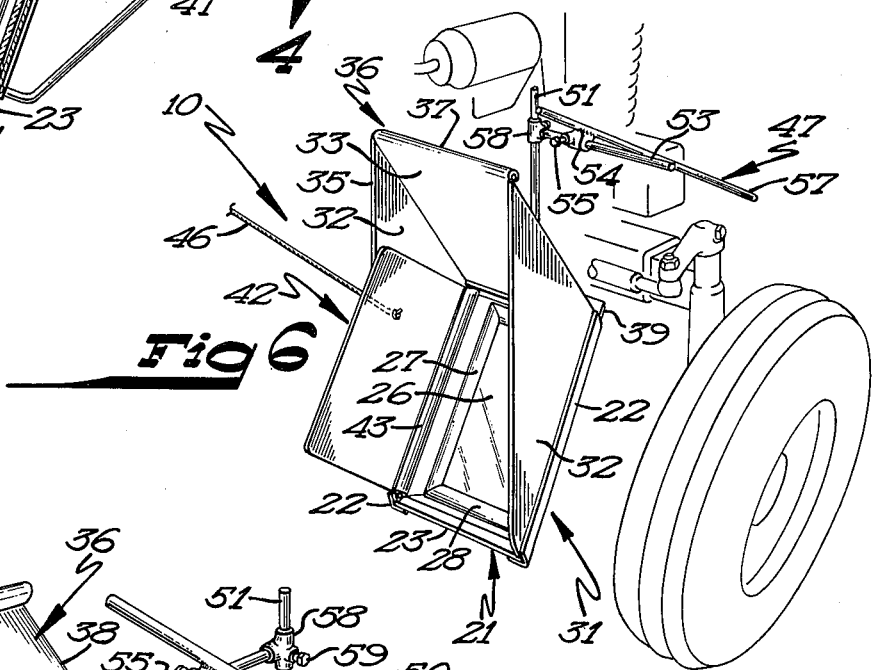
FIG. 6 is a front perspective view of the mirror and guide device.

The mirror assembly 20 is connected to the channel bracket 16 by means of an elongate upper brace 40 and a pair of elongate lower braces 41. Referring now to FIG. 5, it will be noted that the respective forward ends of the braces are rigidly secured to the lower flange of the channel bracket 16 and the braces project outwardly and rearwardly therefrom. The rearward end of the upper brace 40 is connected to the upper end portion of the outermost side frame element 22. The rearward ends of the lower braces 41 are each connected to the lower end portion of one of the side frame elements 22. It will be noted as best seen in FIGS. 2 and 3 that when the channel bracket 16 is mounted on the tractor, the rectangular frame and a mirror 26 will be disposed in angulated relation and will extend downwardly and rearwardly to facilitate observation of the cultivator tools by the tractor operator.

Means are also provided for protecting the mirror against damage when the tractor is being driven from one location to another and it is not being used in a cultivating operation. To this end, a substantially flat, generally rectangular shaped cover plate 42 is provided, having a rolled inner edge 43 through which projects a pivotal or hinged pin 44. The hinge pin is connected to the frame 21, adjacent the inner side thereof to swingably mount the cover plate thereon for swinging movement between open and closed positions. When the cover plate 42 is in the closed position, the cover plate covers the rear surface of the mirror and will prevent damage thereto. However, when the cover plate 42 is in the open position, it will be positioned adjacent the innermost side plate of the shield structure, and will in no way obstruct the vision of the tractor operator with respect to the mirror.

It will be noted that because of the angulated relation of the mirror and supporting frame 21, the cover plate 42 will normally be urged to the closed position by the action of gravity. Means are therefore provided for retaining the cover plate in an open condition. This means includes an elongate flexible member or rope 46 which has one end thereof extending through an opening 45 in the cover plate and has its other end extending upwardly to a point adjacent the tractor operator. With this arrangement, the tractor operator may retain the cover plate in an open position and by merely releasing the taut rope, the cover plate may be allowed to swing to the closed position.

Means are also provided for facilitating guiding of the tractor during the cultivating operation and this means includes a guide assembly 47. The guide assembly 47 is comprised of a mounting sleeve 48 which is rigidly secured to the channel bracket 16 and which is provided with a set screw 49. An L-shaped mounting arm 50 includes an elongate vertical portion 51, a horizontal portion 52 and a terminal portion 53 which projects angularly from the vertical portion 51. The terminal portion 53 projects into the mounting sleeve 48 and is secured in a preselected angulated relation by the set screw 49. The horizontal portion 52 of the L-shaped mounting arm 50 has a mounting sleeve 54 mounted thereon and provided with a set screw 55. Thus the mounting sleeve 54 may be adjusted longitudinally as well as angularly with respect to the horizontal portion 52. The mounting sleeve 54 also has a stud 66 rigidly affixed thereto and projecting outwardly therefrom.

The guide assembly includes an elongate substantially straight guide rod or element 57 which is provided with a sleeve 58 rigidly affixed thereto, adjacent one end thereof. The sleeve 58 is also provided with a set screw 49 and is mounted on the stud 56. With this arrangement, the sleeve may be rotated on the stud 56 to adjust the angular position of the guide rod 57. It will also be noted that the guide assembly is capable of a wide range of adjustment to properly position the guide rod in a predetermined position to facilitate guiding of the tractor during the cultivating operation. In this respect, the guide rod will be positioned so that the sight line of the tractor operator centers the guide rod with respect to a crop row to be cultivated. This permits the tractor to be properly guided between the rows during the cultivating operation.

During the cultivating operation, the tractor will be driven in a forward direction so that the cultivator shovels of the cultivator implement will cultivate the soil between the rows. The shields of a pair of rolling shields will be disposed on opposite sides of the row being cultivated. The mirror assembly 20 permits the operator to clearly view at least one pair of the rolling shield assemblies as well as the adjacent cultivator shovels located on opposite sides thereof. Thus the tractor operator, by properly positioning the pair of rolling shields being observed and adjacent pair of cultivator shovels with respect to a single row will be assured that effective cultivation is accomplished without danger of covering the plants with soil or damage of plant roots by the cultivator shovels. Since the mirror assembly is positioned just rearwardly of and at approximately the same level as the right front wheel of the tractor, the operator may face forwardly at all times, but will have an excellent, unobstructed view of a pair of rolling shields and cultivator shovels during the cultivating operation.

By mounting the guide assemblies adjacent but just forwardly of the mirror assembly, the mirror and the guide assembly are in an optimum position for observation by the tractor operator. Thus the forward travel of the tractor as well as the precise positioning of the cultivator shields and cultivator shovels are constantly in the vision of the tractor operator while permitting the operator to comfortably face forwardly at all times.

Thus it will be seen that I have provided a novel mirror and guide device which may be readily mounted on any conventional tractor and which allows the tractor operator to effectively cultivate while facing forwardly at all times.

It will further be noted that I have provided a novel mirror guide device which is not only of simple and inexpensive construction, but one which functions in a more efficient manner than any heretofore known comparable device.

What is claimed is:

1. A mirror and guide attachment device for a tractor having a trailing cultivator implement towed thereby, said device comprising:
    a mounting bracket adapted to be attachably mounted on the tractor adjacent one of the front wheels thereof,
    a rigid generally rectangular mirror frame, means connecting the mirror frame with said bracket for spacing the frame laterally of the tractor body and rearwardly and adjacent one of the front tractor wheels, a rearwardly facing generally rectangularly shaped mirror mounted on said frame, yieldable means interposed between said mirror and the frame to dampen and absorb vibrations thereto, said mirror being disposed in angulated relation and extending downwardly and rearwardly with respect to the surface of the ground, said mirror being disposed at approximately the same height as the upper portion of the adjacent front tractor wheel, a peripheral shield structure secured to said frame and including a pair of substantially flat rearwardly projecting side plates positioned on opposite sides of the mirror and a top plate secured to said side plates and projecting rearwardly from adjacent the top portion of said mirror to reduce glare and protect the mirror from flying objects, a substantially flat cover plate shiftably connected with said mirror frame and being swingable between open and closed positions, said cover plate when in the closed position, overlying and covering said mirror, and when in the open position, being disposed in unobstructing relation with respect to the mirror.

2. The mirror and guide device as defined in claim 1 and an adjustable guide assembly, including guide mounting means connected with said bracket, and elongate substantially straight guide element connected with said guide mounting means and positioned forwardly of the mirror and permitting a tractor operator to align the guide element with a crop row being cultivated to facilitate cultivation thereof.

3. The mirror and guide device as defined in claim 1 wherein said yieldable means includes a plurality of slotted dampening elements each having an inner slot therein receiving a peripheral edge of the mirror frame therein.

4. The mirror guide device as defined in claim 2 wherein said guide mounting means includes an elongate substantially straight vertical mounting element, an elongate substantially straight horizontal mounting element adjustably secured to said vertical mounting element and being adjustable relative thereto, means adjustably mounting said vertical mounting element on said bracket to permit adjustment of said vertical mounting element relative to said bracket, and means mounting said elongate guide element on said horizontal mounting element to permit relative adjustment therebetween.

* * * * *